US008806475B2

(12) United States Patent
Xie

(10) Patent No.: US 8,806,475 B2
(45) Date of Patent: Aug. 12, 2014

(54) TECHNIQUES FOR CONDITIONAL DEPLOYMENT OF APPLICATION ARTIFACTS

(75) Inventor: Nan Xie, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 518 days.

(21) Appl. No.: 12/881,028

(22) Filed: Sep. 13, 2010

(65) Prior Publication Data

US 2012/0066674 A1  Mar. 15, 2012

(51) Int. Cl.
*G06F 9/445* (2006.01)
(52) U.S. Cl.
USPC ............................. 717/174; 717/172; 717/177
(58) Field of Classification Search
None
See application file for complete search history.

(56) References Cited

U.S. PATENT DOCUMENTS

| | | | |
|---|---|---|---|
| 5,699,518 A | 12/1997 | Held et al. | |
| 5,850,518 A | 12/1998 | Northrup | |
| 6,397,254 B1 | 5/2002 | Northrup | |
| 6,421,705 B1 | 7/2002 | Northrup | |
| 6,546,413 B1 | 4/2003 | Northrup | |
| 6,671,713 B2 | 12/2003 | Northrup | |
| 6,671,746 B1 | 12/2003 | Northrup | |
| 6,779,000 B1 | 8/2004 | Northrup | |
| 6,922,705 B1 | 7/2005 | Northrup | |
| 7,062,749 B2 | 6/2006 | Cyr et al. | |
| 7,512,942 B2 * | 3/2009 | Brown et al. | 717/174 |
| 7,526,764 B2 * | 4/2009 | Fanshier | 717/174 |
| 7,535,927 B1 | 5/2009 | Northrup | |
| 7,603,674 B2 | 10/2009 | Cyr et al. | |
| 7,607,126 B2 * | 10/2009 | Read | 717/172 |
| 7,676,806 B2 * | 3/2010 | Curtis et al. | 717/177 |
| 7,774,404 B2 | 8/2010 | Heidasch | |

(Continued)

OTHER PUBLICATIONS

Schmidt, Douglas. Model-Driven Engineering, IEEE Computer, Feb. 2006 (vol. 39, No. 2) pp. 25-31. Retrieved on [Apr. 18, 2014] Retrieved from the Internet: URL<http://dl.acm.org/citation.cfm?id=1115706>.*

(Continued)

*Primary Examiner* — Thuy Dao
*Assistant Examiner* — Cheneca Smith
(74) *Attorney, Agent, or Firm* — Kilpatrick Townsend & Stockton LLP

(57) ABSTRACT

Techniques for conditionally deploying artifacts of a software application (e.g., a SOA application). In one set of embodiments, a deployment plan can be generated that specifies a list of artifacts to be deployed for the application. At a time of deployment, the deployment plan can be retrieved and processed by an installation module to carry out the deployment process. As part of this processing, the installation module can determine, for each artifact in the deployment plan, whether the artifact is associated with a user-defined condition. If such an association is found, the installation module can evaluate the user-defined condition and execute conditional deployment logic for the artifact based on the outcome of the evaluation. In this manner, the deployment activities to be carried out for the application can be dynamically modified at the time of deployment.

14 Claims, 6 Drawing Sheets

(56) References Cited

U.S. PATENT DOCUMENTS

| | | | |
|---|---|---|---|
| 7,840,669 B2 | 11/2010 | Dutta et al. | |
| 7,870,550 B1 * | 1/2011 | Qureshi et al. | 717/174 |
| 7,873,960 B2 * | 1/2011 | Templin et al. | 717/175 |
| 8,015,541 B1 | 9/2011 | Srinivasan et al. | |
| 8,140,582 B2 | 3/2012 | Chen et al. | |
| 8,239,819 B2 | 8/2012 | Hafermann et al. | |
| 8,527,985 B2 * | 9/2013 | Srinivasamoorthy et al. | 717/177 |
| 8,584,119 B2 * | 11/2013 | Ellington et al. | 717/177 |
| 8,627,309 B2 * | 1/2014 | Scheidel et al. | 717/172 |
| 2002/0184610 A1 | 12/2002 | Chong et al. | |
| 2003/0172127 A1 | 9/2003 | Northrup | |
| 2004/0148370 A1 | 7/2004 | Sadiq | |
| 2005/0086197 A1 | 4/2005 | Boubez et al. | |
| 2005/0204356 A1 | 9/2005 | Sundararajan et al. | |
| 2005/0262191 A1 | 11/2005 | Mamou et al. | |
| 2005/0289536 A1 * | 12/2005 | Nayak et al. | 717/174 |
| 2006/0031831 A1 * | 2/2006 | Templin et al. | 717/175 |
| 2006/0041643 A1 | 2/2006 | Fanshier | |
| 2006/0095274 A1 | 5/2006 | Phillips et al. | |
| 2006/0150156 A1 | 7/2006 | Cyr et al. | |
| 2006/0253848 A1 | 11/2006 | Mathieu et al. | |
| 2006/0265508 A1 | 11/2006 | Angel et al. | |
| 2007/0028208 A1 | 2/2007 | Maki | |
| 2007/0055972 A1 * | 3/2007 | Brown et al. | 717/174 |
| 2007/0074203 A1 * | 3/2007 | Curtis et al. | 717/174 |
| 2008/0065466 A1 | 3/2008 | Liu et al. | |
| 2008/0127047 A1 | 5/2008 | Zhang et al. | |
| 2008/0250386 A1 | 10/2008 | Erl | |
| 2008/0256507 A1 | 10/2008 | Chaar et al. | |
| 2008/0282219 A1 | 11/2008 | Seetharaman et al. | |
| 2009/0006147 A1 | 1/2009 | Padmanabhan | |
| 2009/0022151 A1 | 1/2009 | Jeon et al. | |
| 2009/0094577 A1 | 4/2009 | Fachat | |
| 2009/0276769 A1 * | 11/2009 | Brannen et al. | 717/174 |
| 2009/0281996 A1 | 11/2009 | Liu et al. | |
| 2009/0285376 A1 | 11/2009 | Kremer-Davidson et al. | |
| 2009/0300192 A1 | 12/2009 | Northrup | |
| 2010/0017387 A1 | 1/2010 | Roshen | |
| 2010/0042986 A1 * | 2/2010 | Greiner et al. | 717/174 |
| 2010/0095266 A1 | 4/2010 | Novak | |
| 2010/0125618 A1 | 5/2010 | Dutta et al. | |
| 2010/0217636 A1 | 8/2010 | Channabasavaiah et al. | |
| 2010/0228587 A1 | 9/2010 | Channabasavaiah et al. | |
| 2010/0318974 A1 | 12/2010 | Hrastnik et al. | |
| 2011/0078654 A1 | 3/2011 | Thies et al. | |
| 2011/0161913 A1 | 6/2011 | Garimella et al. | |
| 2011/0161914 A1 | 6/2011 | Xie et al. | |
| 2011/0161915 A1 | 6/2011 | Srinivasamoorthy et al. | |
| 2011/0161921 A1 | 6/2011 | Garimella et al. | |
| 2011/0276961 A1 | 11/2011 | Johansson et al. | |
| 2012/0167072 A1 * | 6/2012 | Boykin et al. | 717/172 |

OTHER PUBLICATIONS

Laliwala et al. Event-driven Service-Oriented Architecture. 2008 International Conference on Service Systems and Service Management, Jun.-Jul. 2008, Retrieved on [Apr. 18, 2014] Retrieved from the Internet: URL<http://ieeexplore.ieee.org/xpls/abs_all.jsp?arnumber=4598452&tag=1>.*

Adcock et al., "ANSAware and DCE-A Comparison" May 1994, 68 pages.

Li, "An overview of real time ANSAware 1.0," Distribution System Engineering 2, Copyright 1995, pp. 28-38, The British Computer Society, UK.

Non-Final Office Action for U.S. Appl. No. 12/769,016 mailed on Nov. 23, 2012, 11 pages.

Non-Final Office Action for U.S. Appl. No. 12/769,006 mailed on Dec. 7, 2012, 13 pages.

Non-Final Office Action for U.S. Appl. No. 12/768,990 mailed on Feb. 28, 2013, 11 pages.

Non-Final Office Action for U.S. Appl. No. 12/768,999 mailed on Mar. 15, 2013, 13 pages.

Final Office Action for U.S. Appl. No. 12/769,006 mailed on May 8, 2013, 17 pages.

Notice of Allowance for U.S. Appl. No. 12/769,016 mailed on May 8, 2013, 9 pages.

Advisory Action for U.S. Appl. No. 12/769,006 mailed on Jul. 1, 2013, 3 pages.

U.S. Appl. No. 13/970,516, filed on Aug. 19, 2013 by Srinivasamoorthy et al.

Non-Final Office Action for U.S. Appl. No. 12/769,006 mailed on Aug. 1, 2013, 20 pages.

Final Office Action for U.S. Appl. No. 12/768,999 mailed on Aug. 9, 2013, 13 pages.

Final Office Action for U.S. Appl. No. 12/768,990 mailed on Oct. 2, 2013, 12 pages.

Final Office Action for U.S. Appl. No. 12/769,006 mailed on Oct. 10, 2013, 21 pages.

Cox et al., "Management of the Service-Oriented-Architecture Life Cycle", IBM Systems Journal, col. 44, No. 4, 2005 18 pages.

Laliwala et al., "Event-Driven Service-Oriented Architecture", IEEE, 2008, 6 pages.

Non-Final Office Action for U.S. Appl. No. 12/768,999 mailed on Dec. 11, 2013, 14 pages.

Notice of Allowance for U.S. Appl. No. 12/769,006 mailed on Jan. 16, 2014, 8 pages.

* cited by examiner

```xml
<DeploymentPlan component ="FP" version="3.0">
 <PreConfiguration>
   <!-- Add custom content -->
 </PreConfiguration>
 <Configurations>
   <Datasource name="fodDS" jndiLocation="jdbc/fodDS" action="create" resourcetargetidentifier="fod" wlserver="fp"/>
   <Datasource name="SOADemo" jndiLocation="jdbc/SOADemo" action="create" resourcetargetidentifier="fod" wlserver="1"/>
   <UpdateMetadata wlserver="fp"/>
     <fileset dir="${AIA_HOME}/AIAMetaData">
       <include name="AIAComponents/ApplicationObjectLibrary/AIADemo/**"/>
     </fileset>
   </UpdateMetadata>
   <DbAdapter connection-instance-jndi="eis/DB/fodDS" datasource-jndi="jdbc/fodDS" action="create" wlserver="fp"/>
   <DbAdapter connection-instance-jndi="eis/DB/SOADemo" datasource-jndi="jdbc/SOADemo" action="create" wkserver="fp"/>
   <JMSResource jmsResourceType="ConnectionFactory" jmsResourceName="jms/aia/AIADemoBatchQueueCF" jmsModuleName="AIAJMSModule" mjsSubDeploymentName="AIASubDeployment" action="create" wlserver="fp"/>
   <JMSAdapter connection-instance-jndi="eis/aia/AIADemoBatch" connection-fac-location="jms/aia/jms/aia/AIADemo" wlserver="fp"/>
 </Configurations>
 <PostConfiguration>
   <!-- Add custom content -->
 </PostConfiguration>
 <PreDeployment>
   <!-- Add custom content -->
 </PreDeployment>
 <Deployments>
   <Composite compositeName="AIADemoProcessSalesOrderCBP" compositedir="/slot/ems3470/oracle/AIAHOME_102" Revision="1.0" wlserver="fp" action="deploy"/>
   <Composite compositeName="AIADemoSyncCustomerPartyReqDBAdapter" compositedir="/slot/ems3470/oracle/AIAHOME_1023/samples/AIADemo/Adapters/AIADemoSyncCustomerPartyReqDBAdapter"/>
   <Composite compositeName="AIADemoSyncCustomerPartyListCRMProvDBAdapter" compositedir="/slot/ems3470/oracle/AIAHOME_1023/samples/AIADemo/Adapters/AIADemoSyncCustomerPartyListCRMProvDBAdapter" action="deploy"/>
   <Composite compositeName="AIADemoCreateShipmentRequestBatchProvABCSImpl" compositedir="/slot/ems3470/oracle/AIAHOME_1023/samples/AIADemo/ProviderABCS/AIADemoCreateShipmentRequestBatchProvABCSImpl" action="deploy"/>
 </Deployments>
 <PostDeployment>
   <!-- Add custom content -->
 </PostDeployment>
</DeploymentPlan>
```

*FIG. 3*

TECHNIQUES FOR CONDITIONAL DEPLOYMENT OF APPLICATION ARTIFACTS

CROSS-REFERENCES TO RELATED APPLICATIONS

The present application incorporates by reference for all purposes the entire contents of the following commonly-assigned patent applications:

U.S. application Ser. No. 12/768,990 entitled "TECHNIQUES FOR MANAGING FUNCTIONAL SERVICE DEFINITIONS IN A SOA DEVELOPMENT LIFECYCLE," filed Apr. 28, 2010;

U.S. application Ser. No. 12/768,999 entitled "TECHNIQUES FOR AUTOMATED GENERATION OF SERVICE ARTIFACTS," filed Apr. 28, 2010;

U.S. application Ser. No. 12/769,006 entitled "TECHNIQUES FOR AUTOMATED GENERATION OF DEPLOYMENT PLANS IN A SOA DEVELOPMENT LIFECYCLE," filed Apr. 28, 2010; and U.S. application Ser. No. 12/769,016 entitled "TECHNIQUES FOR RAPID DEPLOYMENT OF SERVICE ARTIFACTS," filed Apr. 28, 2010.

BACKGROUND

The present disclosure relates generally to the deployment of software applications, and in particular to techniques for conditionally deploying artifacts of a Service Oriented Architecture (SOA) application.

In the field of computer software, deployment refers to the process of making a software application available for use in a runtime environment (e.g., at a customer site). For complex software applications, such as Service Oriented Architecture (SOA) applications, this deployment process can require the installation of a large number of artifacts (e.g., SOA composites, database objects, connection factories, data sources, etc.) across several physical servers/machines.

To facilitate the deployment of a SOA application, techniques have been developed that can capture deployment-related information during the application's development lifecycle and can automatically generate a deployment plan based on the captured information. The deployment plan can include, e.g., all of the artifacts and configurations that are needed for deployment of the application. Once generated, the deployment plan can be processed by an installation module at a customer site to automatically deploy the application content. These techniques (part of a framework referred to as Application Integration Architecture, or AIA) are described in greater detail in U.S. patent application Ser. Nos. 12/768,990, 12/768,999, 12/769,006, and 12/769,016, which are incorporated herein by reference for all purposes.

One shortcoming with existing SOA deployment mechanisms, including the deployment plan mechanism of AIA, is that they cannot adequately allow for the conditional deployment of artifacts. For example, in some situations it may not be necessary to deploy certain artifacts depending on the application version already installed at the customer site. As another example, in some situations the deployment of certain artifacts may be dependent upon the availability of another distinct group of artifacts. In each of these cases, the required deployment activities are not known until the time of deployment/installation at the customer site.

BRIEF SUMMARY

Embodiments of the present invention provide techniques for conditionally deploying artifacts of a software application (e.g., a SOA application). In one set of embodiments, a deployment plan can be generated that specifies a list of artifacts to be deployed for the application. At a time of deployment, the deployment plan can be retrieved and processed by an installation module to carry out the deployment process. As part of this processing, the installation module can determine, for each artifact in the deployment plan, whether the artifact is associated with a user-defined condition. If such an association is found, the installation module can evaluate the user-defined condition and execute conditional deployment logic for the artifact based on the outcome of the evaluation. In this manner, the deployment activities to be carried out for the application can be dynamically modified at the time of deployment.

According to an embodiment of the present invention, a method is provided that comprises receiving, by a computer system, a deployment plan for a software application, wherein the deployment plan specifies a plurality of artifacts for the software application and default deployment logic for the plurality of artifacts. The method further comprises processing, by the computer system, the deployment plan, where the processing comprises determining, for each artifact, in the plurality of artifacts, whether the artifact is associated with a user-defined condition. If the artifact is associated with a user-defined condition, the user-defined condition is evaluated and conditional deployment logic for the artifact is executed based on the evaluation. If the artifact is not associated with a user-defined condition, the default deployment logic for the artifact is executed.

In one embodiment, the conditional deployment logic is distinct from the default deployment logic.

In one embodiment, the user-defined condition and the conditional deployment logic are specified in an executable script, such as an Ant, SQL, or Shell script. In another embodiment, the user-defined condition and the conditional deployment logic are stored in a rule engine.

In one embodiment, the user-defined condition or the conditional deployment logic is expressed using one or more variables whose values are input via a user interface prior to the processing.

In one embodiment, the user-defined condition or the conditional deployment logic is expressed using one or more variables whose values are derived from a deployment history of another software application.

In one embodiment, the user-defined condition or the conditional deployment logic is expressed using one or more variables whose values are set by a user-defined script.

In one embodiment, the user-defined condition and the conditional deployment logic are specified by a developer of the software application. In another embodiment, the user-defined condition and the conditional deployment logic are specified by a customer installing the software application.

In one embodiment, the conditional deployment logic includes logic for deploying or undeploying the artifact. In other embodiments, the conditional deployment logic can include performing no action, or performing other types of logic, such as creating artifacts in a filesystem directory or application server, etc.

In one embodiment, the software application is a SOA application.

In one embodiment, the deployment plan is generated by storing a functional representation of the SOA application in a shared data store, collecting metadata pertaining to services used by the SOA application, and generating the deployment plan based on the functional representation and the metadata.

According to another embodiment of the present invention, a non-transitory, computer-readable medium is provided, where the computer-readable medium has stored thereon program code executable by a computer system. The program code comprises code that causes the computer system to receive a deployment plan for a software application, where the deployment plan specifies a plurality of artifacts for the software application and default deployment logic for the plurality of artifacts. The program code further comprises code that causes the computer system to process the deployment plan, the processing including determining, for each artifact in the plurality of artifacts, whether the artifact is associated with a user-defined condition. If the artifact is associated with a user-defined condition, the user-defined condition is evaluated and the conditional deployment logic for the artifact is executed based on the evaluation. If the artifact is not associated with a user-defined condition, the default deployment logic for the artifact is executed.

According to another embodiment of the present invention, a system is provided. The system comprises a storage device configured to store a deployment plan for the software application, where the deployment plan specifies a plurality of artifacts for the software application and default deployment logic for the plurality of artifacts. The system further comprises a processor configured to process the deployment plan by, e.g., determining, for each artifact in the plurality of artifacts, whether the artifact is associated with a user-defined condition. If the artifact is associated with a user-defined condition, he user-defined condition is evaluated and the conditional deployment logic for the artifact is executed based on the evaluation. If the artifact is not associated with a user-defined condition, the default deployment logic for the artifact is executed.

A further understanding of the nature and advantages of the embodiments disclosed herein can be realized by reference to the remaining portions of the specification and the attached drawings.

BRIEF DESCRIPTION OF THE DRAWINGS

FIG. 3 illustrates an example deployment plan in accordance with an embodiment of the present invention.

DETAILED DESCRIPTION

In the following description, for the purposes of explanation, numerous details are set forth in order to provide an understanding of embodiments of the present invention. It will be apparent, however, to one of ordinary skill in the art that certain embodiments can be practiced without some of these details.

Embodiments of the present invention provide techniques for conditionally deploying artifacts of a software application (e.g., a SOA application). In one set of embodiments, a deployment plan can be generated that specifies a list of artifacts to be deployed for the application. At a time of deployment, the deployment plan can be retrieved and processed by an installation module to carry out the deployment process. As part of this processing, the installation module can determine, for each artifact in the deployment plan, whether the artifact is associated with a user-defined condition. If such an association is found, the installation module can evaluate the user-defined condition and execute conditional deployment logic for the artifact based on the outcome of the evaluation. In this manner, the deployment activities to be carried out for the application can be dynamically modified at the time of deployment.

Figure 1:
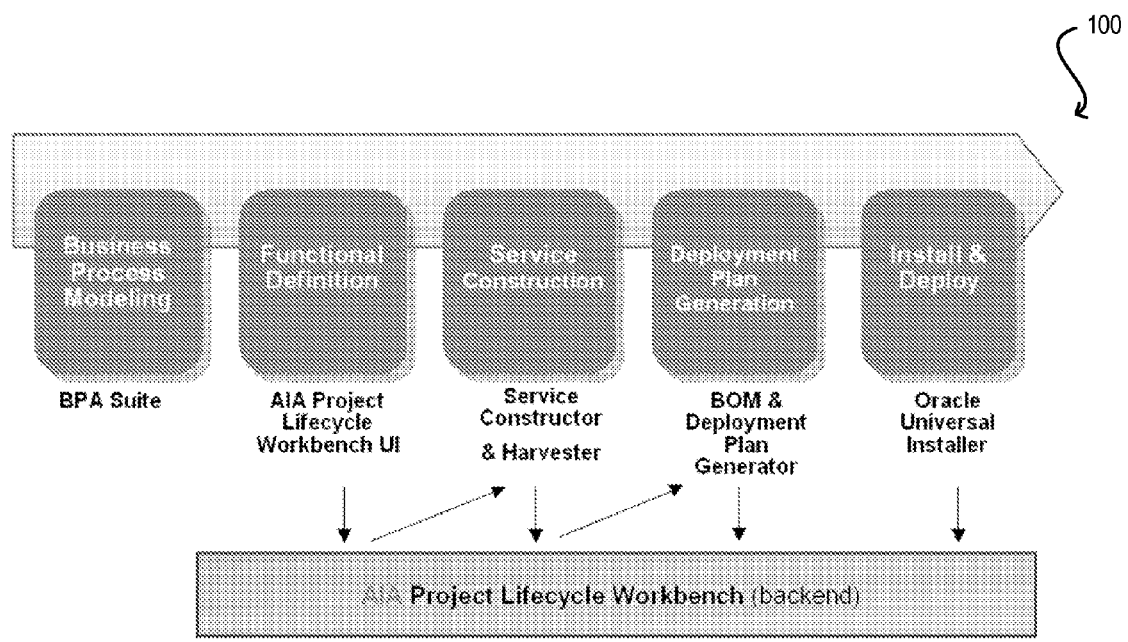
FIG. 1 is a simplified block diagram illustrating an example SOA development lifecycle as facilitated by Application Integration Architecture (AIA).

FIG. 1 is a simplified block diagram illustrating an exemplary development lifecycle 100 for a SOA application, and components of a framework (referred to as Application Integration Architecture, AIA) for facilitating the lifecycle. FIG. 1 is provided to illustrate how the conditional deployment techniques described herein can be incorporated into an application development framework such as AIA.

As shown, lifecycle 100 can include five lifecycle phases: business process modeling, functional definition, service construction, deployment plan generation, and installation & deployment. In various embodiments, the AIA framework can capture development-related information in a shared data store and cause the information to flow in an automated or semi-automated manner from one lifecycle phase (and corresponding toolings) to the next as the lifecycle progresses. This information flow can, in turn, facilitate automations at each lifecycle phase for the responsible stakeholders (e.g., solution architects, developers, installation developers, etc.).

For example, during the functional definition phase, AIA can capture (via a user interface known as the Project Lifecycle Workbench (PLW)) functional service definitions for the constituent services of a SOA application. These functional service definitions can be persisted in a shared data store (PLW backend). During the service construction lifecycle phase, AIA can automatically generate (via a tool known as the Service Constructor) skeleton code for service artifacts based on the stored functional definitions. In addition, AIA can harvest metadata regarding the service artifacts that is provided by developers, such as default deployment parameters. During the deployment plan generation phase, AIA can present (via the PLW UI with role-based access control) all of the implemented service components of the application, and can enable a user to select the particular components to be deployed with the application. Based on those selections and the metadata harvested during the service construction phase, AIA can automatically generate a deployment plan that includes all of the artifacts and configurations that are needed for deployment of the application. Finally, during the installation & deployment phase, the generated deployment plan can be automatically processed at the customer site (via a tool known as the Installation Driver) to deploy the application content.

Additional details regarding the AIA framework are provided in U.S. patent application Ser. Nos. 12/768,990, 12/768,999, 12/769,006, and 12/769,016, which are incorporated herein by reference for all purposes.

As noted in the Background section, one issue with existing SOA deployment mechanisms, including the deployment plan mechanism of AIA described above, is that they cannot adequately allow for the conditional deployment of artifacts. For instance, current implementations of the AIA Installation Driver are constrained to deploying or undeploying the artifacts of a SOA application according to the default deployment logic specified in its deployment plan. The Installation Driver cannot, e.g., conditionally perform one deployment logic or another based on variables that are resolved at the time of deployment. It may be possible for development teams to anticipate certain categories of conditions during application development and to structure the deployment plan accordingly to account for those conditions. However, other types of conditions may not be foreseeable prior to the time of deployment/installation at a customer site. For example, certain customers may have conditional deployment requirements that are specific to their site or business.

To address this, embodiments of the present invention can enhance deployment/installation modules such as the AIA Installation Driver to support the conditional deployment of artifacts in a deployment plan. For instance, according to one embodiment, when a deployment plan is processed by the Installation Driver at a customer site, the Installation Driver can check (e.g., via a condition module) whether an artifact in the plan is associated with a user-defined condition. The user-defined condition may have been associated with the artifact by the developer of the application, or by the customer. If such an association is found, the Installation Driver can evaluate (e.g., via the condition module) the user-defined condition and execute conditional logic for deploying the artifact based on the outcome of the condition evaluation. Accordingly, the Installation Driver can perform a conditional deployment action for that particular artifact (rather than simply performing the default logic specified in the deployment plan).

It should be appreciated that FIG. 1 is illustrative and not intended to limit embodiments of the present invention. For example, although FIG. 1 depicts a particular SOA development lifecycle and a particular framework for facilitating that lifecycle, embodiments of the present invention can be used in conjunction with any type of application or application framework to enable the conditional deployment of application artifacts. One of ordinary skill in the art will recognize many variations, modifications, and alternatives.

Figure 2:
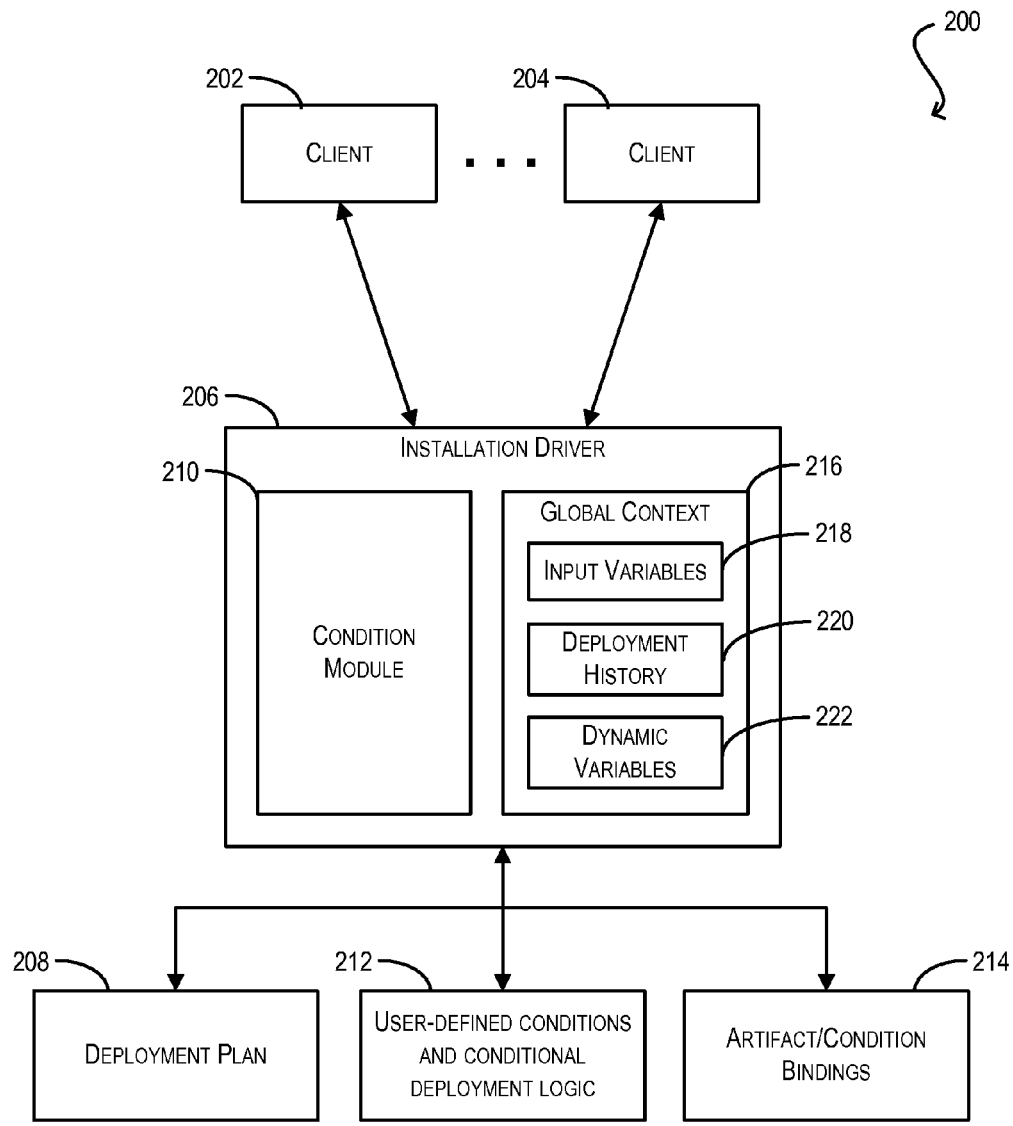
FIG. 2 is a simplified block diagram of a system for conditionally deploying application artifacts in accordance with an embodiment of the present invention.

FIG. 2 is a simplified block diagram of a system 200 for conditionally deploying application artifacts according to an embodiment of the present invention. As shown, system 200 can include one or more clients 202, 204 that are communicatively coupled with an installation driver module 206. Installation driver 206 can be a software and/or hardware-based component that is configured to receive and process data for deploying a software application at a deployment site. In a particular embodiment, installation driver 206 can correspond to the AIA Installation Driver tool described with respect to FIG. 1.

In various embodiments, a user operating client 202 or 204 can access installation driver 206 (via, e.g., a graphical or command-line user interface) and can instruct the installation driver to deploy/install a particular application using deployment plan 208. Deployment plan 208 can include a list of artifacts for the application, as well as default deployment logic (e.g., default installation locations, default artifact configurations, etc.) for deploying each artifact. In response, installation driver 206 can retrieve deployment plan 208 and process the information included in plan 208 to carry out the deployment/installation process. FIG. 3 illustrates an example deployment plan 300 according to an embodiment of the present invention.

As shown in FIG. 2, installation driver 206 can include a condition module 210. In certain embodiments, condition module 210 can be invoked by installation driver 206 while processing deployment plan 208 to facilitate the conditional deployment of artifacts in the plan. In one set of embodiments, condition module 210 can access of a set of user-defined conditions and conditional deployment logic 212. In addition, condition module 210 can access a set of bindings or associations 214 that have been defined between the artifacts in plan 208 and user-defined conditions 212. At the time of processing deployment plan 208, condition module 210 can check, for each artifact in the plan, whether the artifact is associated with a user-defined condition via bindings 214. If such a binding exists, condition module 210 can evaluate the condition and execute the appropriate conditional deployment logic for the artifact based on the outcome of the evaluation. If no artifact/condition binding is found, the artifact can be deployed according to the default deployment logic specified in deployment plan 208.

In one set of embodiments, user-defined conditions and conditional deployment logic 212 can be implemented as a set of executable scripts, such as Ant, Shell, or SQL scripts. In these embodiments, one script can be stored for each artifact. In other embodiments, user-defined conditions and conditional deployment logic 212 can be implemented in various other ways, such as via an external rule engine, via a custom rule syntax, or the like.

Artifact/condition bindings 214 and conditions/conditional logic 212 can be registered and managed by either the developer of the application or the deploying customer. In a particular embodiment, artifact/condition bindings 214 and conditions/conditional logic 212 can be defined and modified via a user interface such as the Project Lifecycle Workbench UI described with respect to FIG. 1.

In one set of embodiments, each user-defined condition (and corresponding conditional deployment logic) can be expressed using one or more variables that are maintained in a global context 216 of installation driver 206. Thus, the deployment logic that is ultimately executed for an artifact can vary based on the values of these variables at the time of deployment. In one set of embodiments, the values of the variables can be persisted in global context 216 for the entirety of a deployment session. In some embodiments, the variable values can be persisted across different deployment sessions.

The variables maintained in global context 216 can include input variables 218 that are set by a user (e.g., operating client 202 or 204) via a user interface upon invoking installation driver 206. Examples of such input variables can include the current application version installed at the deployment site, versions of other installed applications, and the like. The variables can also include deployment history variables that are derived from a prior deployment history of another application. Thus, it is possible for deployment actions to be executed based on an earlier deployment execution. The variables can also include dynamic variables that are set within the scripts implementing the user-defined conditions and conditional deployment logic. For example, script 1 for artifact A can set a dynamic variable V1 in global context 216 while executing conditional deployment logic for A. Script 2 for artifact B (which runs after script 1) can then access dynamic variable V1 while executing conditional deployment logic for B.

In various embodiments, the actions that can be specified in conditional deployment logic 212 can include deploying an artifact, undeploying the artifact, or taking no action. Conditional deployment logic 212 can also specify other types of deployment activities (e.g., fetching data from specific installation directories, copying files, deleting existing files, etc.).

It should be appreciated that system 200 of FIG. 2 is illustrative and not intended to limit embodiments of the present invention. For example, although deployment plan 208, conditions and conditional deployment logic 212, and artifact/ condition bindings 214 are shown as being stored outside the scope of installation driver 206 and condition module 210 (e.g., in an external database or other data store), in some embodiments 208, 212, and/or 214 can be implemented within installation driver 206 or condition module 210. Further, the various entities depicted in system 200 can have other capabilities or include other components that are not specifically described. One of ordinary skill in the art will recognize many variations, modifications, and alternatives.

Figure 4:
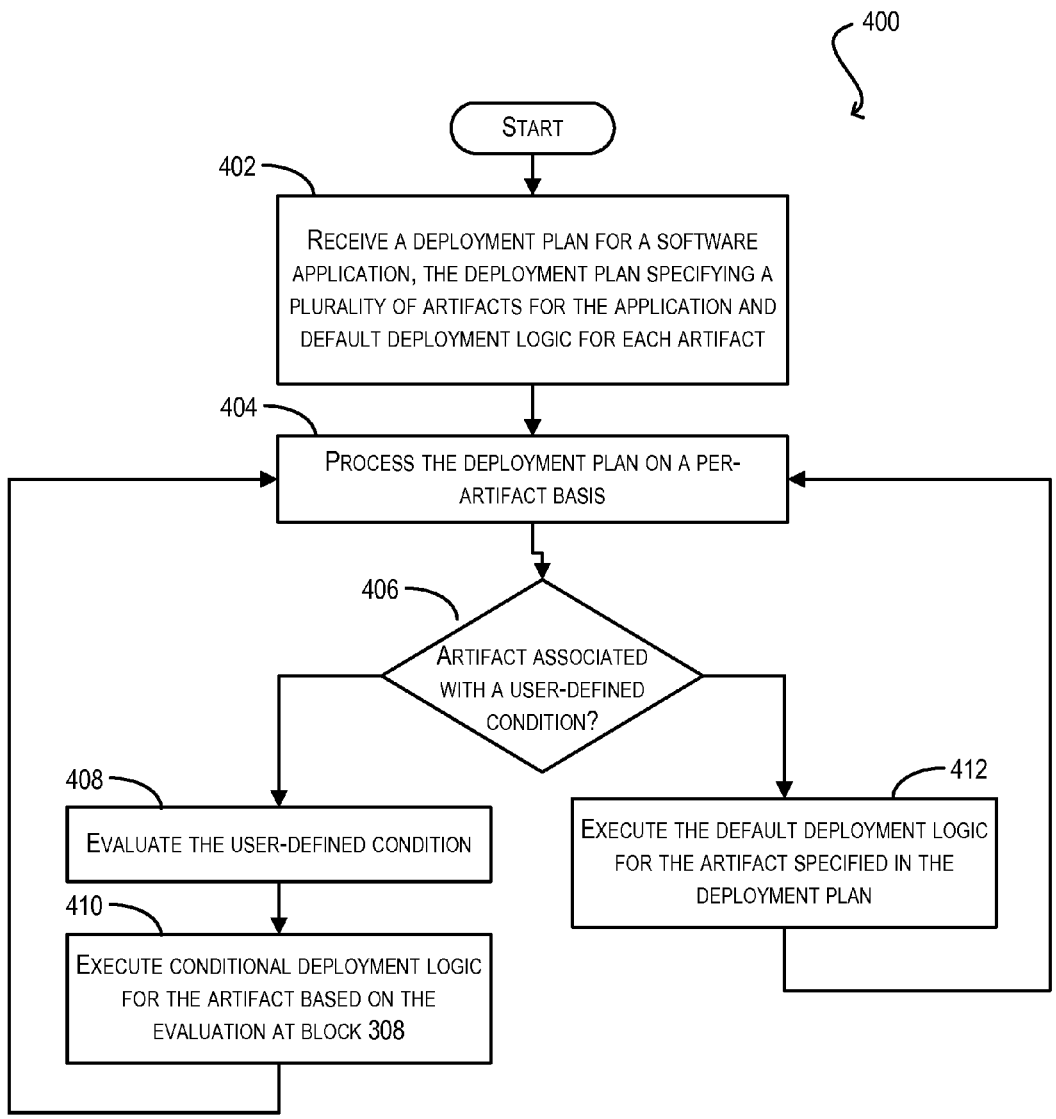
FIG. 4 is a flow diagram illustrating a process for conditionally deploying application artifacts in accordance with an embodiment of the present invention.

FIG. 4 is a flow diagram illustrating a process 400 for conditionally deploying application artifacts according to an embodiment of the present invention. In one set of embodiments, process 400 can be carried out by installation driver 206 and condition module 210 of FIG. 2. Process 400 can be implemented in hardware, software, or a combination thereof. As software, process 400 can be encoded as program code stored on a machine-readable storage medium.

At block 402, installation driver 206 can receive a deployment plan for a software application. In the case of a SOA application, the deployment plan can specific a plurality of artifacts pertaining to service components used by the application (e.g., SOA composites, database objects, connection factories, data sources, adapters, etc.). In addition, the deployment plan can specify default deployment logic (e.g., default installation locations, default artifact configurations, etc.) for each artifact.

At block 404, installation driver 206 can process the deployment plan to carry out deployment/installation of the application. In one set of embodiments, this can include parsing the deployment plan on a per artifact basis and invoking condition module 210 to determine whether a particular artifact is associated with a user-defined condition (block 406). For example, condition module 210 can access artifact/condition bindings 214 of FIG. 2 and search for a binding for the artifact.

If the artifact is associated with a user-defined condition, condition module 210 can evaluate the user-defined condition and execute conditional deployment logic for the artifact based on the outcome of the evaluation (blocks 408, 410). In embodiments where the user-defined condition is expressed using one or more variables maintained in global context 216, the evaluation can include retrieving the current values of those variables from context 216. As described with respect to FIG. 2, examples of such variables can include user input variables, deployment history variables, and dynamic variables.

If the artifact is not associated with a user-defined condition, condition module 210 can execute the default deployment logic for the artifact specified in the deployment plan (block 412). Process 400 can then return to block 404, where the flow can be repeated until all of the artifacts in the deployment plan have been processed.

It should be appreciated that process 400 is illustrative and that variations and modifications are possible. Steps described as sequential can be executed in parallel, order of steps can be varied, and steps can be modified, combined, added, or omitted. One of ordinary skill in the art will recognize many variations, modifications, and alternatives.

Figure 5:
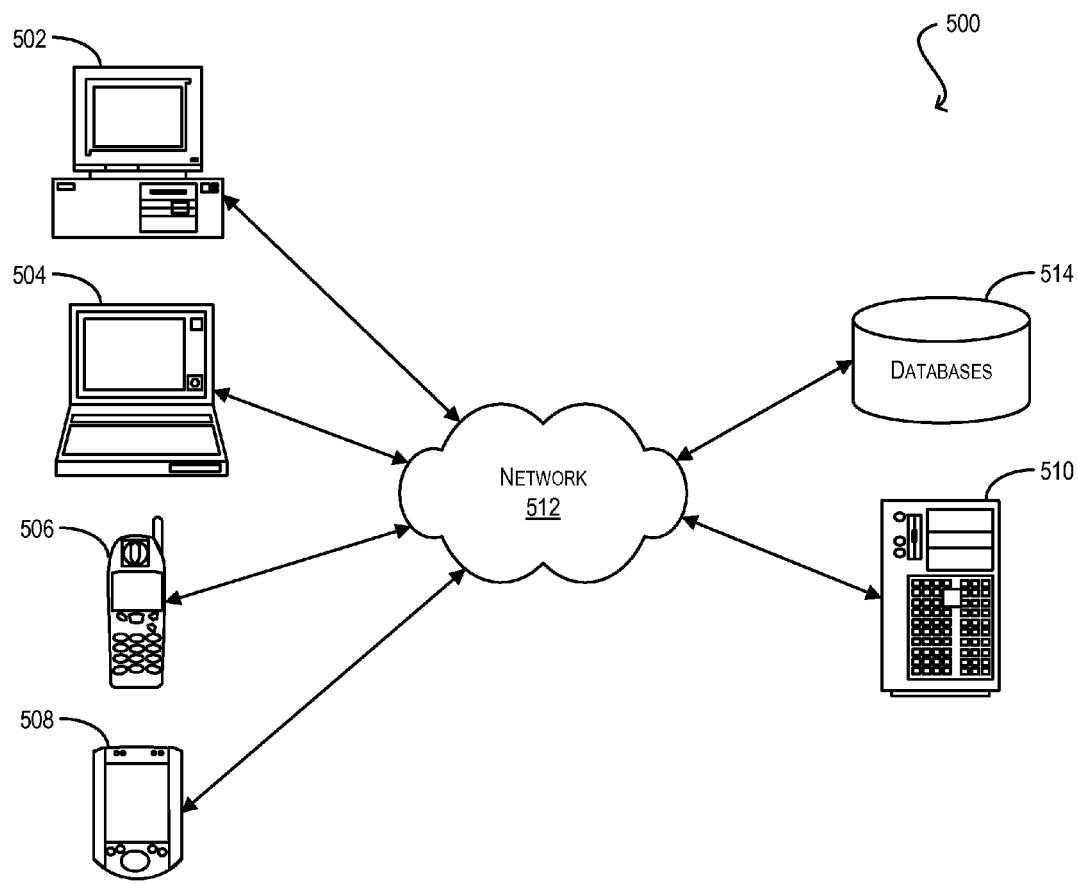
FIG. 5 is a simplified block diagram illustrating a system environment in accordance with an embodiment of the present invention.

FIG. 5 is a simplified block diagram illustrating a system environment 500 that can be used in accordance with an embodiment of the present invention. As shown, system environment 500 can include one or more client computing devices 502, 504, 506, 508, which can be configured to operate a client application such as a web browser, a UNIX/Solaris terminal application, and/or the like. In various embodiments, client computing devices 502, 504, 506, 508 can correspond to clients 202, 204 of FIG. 2, and can be operated by one or more users to invoke and interact with installation driver 206.

Client computing devices 502, 504, 506, 508 can be general purpose personal computers (e.g., personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 502, 504, 506, 508 can be any other electronic device capable of communicating over a network, such as network 512 described below. Although system environment 500 is shown with four client computing devices, it should be appreciated that any number of client computing devices can be supported.

System environment 500 can further include a network 512. Network 512 can be any type of network familiar to those skilled in the art that can support data communications using a network protocol, such as TCP/IP, SNA, IPX, AppleTalk, and the like. Merely by way of example, network 512 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 500 can further include one or more server computers 510 which can be general purpose computers, specialized server computers (including, e.g., PC servers, UNIX servers, mid-range servers, mainframe computers, rack-mounted servers, etc.), server farms, server clusters, or any other appropriate arrangement and/or combination. Server 510 can run an operating system including any of those discussed above, as well as any commercially available server operating system. Server 510 can also run any of a variety of server applications and/or mid-tier applications, including web servers, FTP servers, CGI servers, Java virtual machines, and the like. In one set of embodiments, server 510 can be configured to run an installation/deployment module such as installation driver 206.

System environment 500 can further include one or more databases 514. In one set of embodiments, databases 514 can be configured to store any of the data described in the foregoing disclosure, such as deployment plan 208, user-defined conditions and conditional logic 212, and condition/artifact bindings 214. Databases 514 can reside in a variety of locations. By way of example, databases 514 can reside on a storage medium local to (and/or resident in) one or more of computers 502, 504, 506, 508, and 510. Alternatively, databases 514 can be remote from any or all of computers 502, 504, 506, 508, and 510, and/or in communication (e.g., via network 512) with one or more of these. In one set of embodiments, databases 514 can reside in a storage-area network (SAN) familiar to those skilled in the art.

Figure 6:
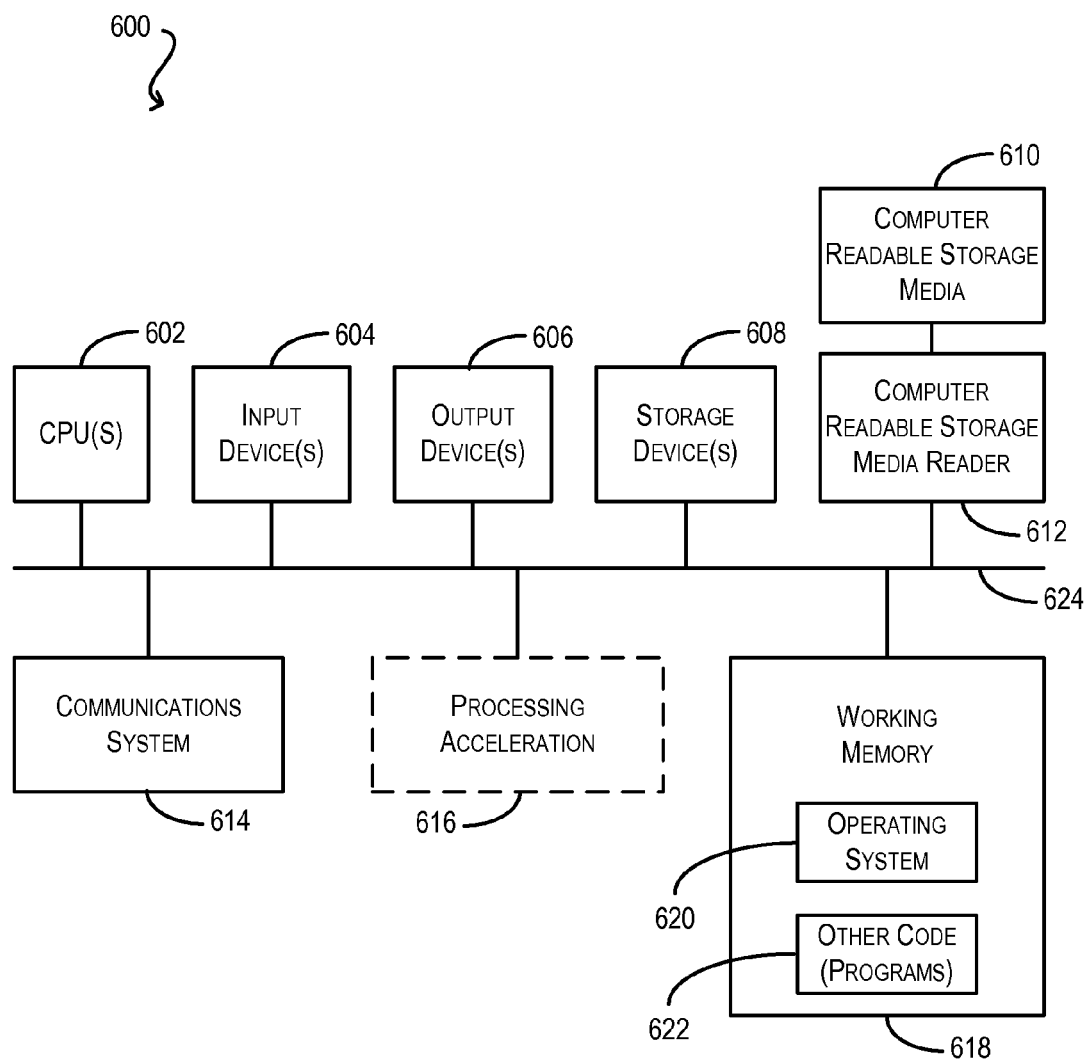
FIG. 6 is a simplified block diagram illustrating a computer system in accordance with an embodiment of the present invention.

FIG. 6 is a simplified block diagram illustrating a computer system 600 that can be used in accordance with an embodiment of the present invention. In various embodiments, computer system 600 can be used to implement any of computers 602, 604, 606, 608, and 610 described with respect to system environment 500 above. As shown, computer system 600 can include hardware elements that are electrically coupled via a bus 624. The hardware elements can include one or more central processing units (CPUs) 602, one or more input devices 604 (e.g., a mouse, a keyboard, etc.), and one or more output devices 606 (e.g., a display device, a printer, etc.). Computer system 600 can also include one or more storage devices 608. By way of example, the storage device(s) 608 can include devices such as disk drives, optical storage devices, and solid-state storage devices such as a random access memory (RAM) and/or a read-only memory (ROM), which can be programmable, flash-updateable and/or the like.

Computer system 600 can additionally include a computer-readable storage media reader 612, a communications subsystem 614 (e.g., a modem, a network card (wireless or wired), an infra-red communication device, etc.), and working memory 618, which can include RAM and ROM devices as described above. In some embodiments, computer system 600 can also include a processing acceleration unit 616, which can include a digital signal processor (DSP), a special-purpose processor, and/or the like.

Computer-readable storage media reader 612 can be connected to a computer-readable storage medium 610, together (and, optionally, in combination with storage device(s) 608) comprehensively representing remote, local, fixed, and/or removable storage devices plus storage media for temporarily and/or more permanently containing computer-readable information. Communications system 614 can permit data to be exchanged with network 512 and/or any other computer described above with respect to system environment 500.

Computer system 600 can also comprise software elements, shown as being currently located within working memory 618, including an operating system 620 and/or other code 622, such as an application program (which may be a client application, Web browser, middle tier/server application, etc.). It should be appreciated that alternative embodiments of computer system 600 can have numerous variations from that described above. For example, customized hardware can be used and particular elements can be implemented in hardware, software, or both. Further, connection to other computing devices such as network input/output devices can be employed.

Computer readable storage media for containing code, or portions of code, executable by computer system 600 can include any appropriate media known or used in the art, such as but not limited to volatile/non-volatile and removable/non-removable media. Examples of computer-readable storage media include RAM, ROM, EEPROM, flash memory, CD-ROM, digital versatile disk (DVD) or other optical storage, magnetic cassettes, magnetic tape, magnetic disk storage or other magnetic storage devices, an any other medium that can be used to store data and/or program code and that can be accessed by a computer.

Although specific embodiments of the invention have been described above, various modifications, alterations, alternative constructions, and equivalents are within the scope of the invention. For example, the techniques described above are not limited to conditionally deploying artifacts for SOA applications; rather, they can be used to facilitate conditional deployment for any type of software application. Further, although embodiments of the present invention have been described with respect to certain flow diagrams and steps, it should be apparent to those skilled in the art that the scope of the present invention is not limited to the described diagrams/steps.

Yet further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention as set forth in the following claims.

What is claimed is:

1. A method comprising:
receiving, by a computer system, a deployment plan for a software application, the deployment plan specifying a plurality of artifacts for the software application and default deployment logic for the plurality of artifacts, the software application comprising a Service Oriented Architecture application, the deployment plan generated based at least in part by:
storing a functional representation of the Service Oriented Architecture application in a shared data store;
collecting metadata pertaining to software services used by the Service Oriented Architecture application; and
generating the deployment plan based at least in part on the functional representation and the metadata; and
processing, by the computer system, the deployment plan, the processing comprising:
determining, for each artifact in the plurality of artifacts, whether the artifact is associated with a user-defined condition, the user-defined condition including variables provided by a user for modifying the deployment plan, the deployment plan modified by conditional deployment logic based at least in part on the user-defined condition; and
if the artifact is associated with a user-defined condition:
evaluating the user-defined condition; and
executing the deployment plan with the conditional deployment logic for the artifact based at least in part on the evaluation of the user-defined condition.

2. The method of claim 1 wherein the processing further comprises:
if the artifact is not associated with a user-defined condition, executing the default deployment logic for the artifact.

3. The method of claim 1 wherein the conditional deployment logic is distinct from the default deployment logic.

4. The method of claim 1 wherein the user-defined condition and the conditional deployment logic are specified in an executable script associated with the artifact.

5. The method of claim 4 wherein the executable script is a Shell script or an Ant script.

6. The method of claim 1 wherein the user-defined condition and the conditional deployment logic are stored in a rule engine.

7. The method of claim 1 wherein the user-defined condition or the conditional deployment logic is expressed using one or more variables whose values are input via a user interface prior to the processing.

8. The method of claim 1 wherein the user-defined condition or the conditional deployment logic is expressed using one or more variables whose values are derived from a deployment history of another software application.

9. The method of claim 1 wherein the user-defined condition or the conditional deployment logic is expressed using one or more variables whose values are set by a user-defined script.

10. The method of claim 1 wherein the user-defined condition and the conditional deployment logic are specified by a developer of the software application.

11. The method of claim 1 wherein the user-defined condition and the conditional deployment logic are specified by a customer installing the software application.

12. The method of claim 1 wherein the conditional deployment logic includes logic for undeploying the artifact or taking no action with respect to the artifact.

13. A non-transitory, computer-readable medium having stored thereon program code executable by a computer system, the program code comprising:
- code that causes the computer system to receive a deployment plan for a software application, the deployment plan specifying a plurality of artifacts for the software application and default deployment logic for the plurality of artifacts, the software application comprising a Service Oriented Architecture application, the deployment plan generated based at least in part by:
  - storing a functional representation of the Service Oriented Architecture application in a shared data store;
  - collecting metadata pertaining to software services used by the Service Oriented Architecture application; and
  - generating the deployment plan based at least in part on the functional representation and the metadata; and
- code that causes the computer system to process the deployment plan, the processing comprising:
  - determining, for each artifact in the plurality of artifacts, whether the artifact is associated with a user-defined condition, the user-defined condition including variables provided by a user for modifying the deployment plan, the deployment plan modified by conditional deployment logic based at least in part on the user-defined condition; and
  - if the artifact is associated with a user-defined condition:
    - evaluating the user-defined condition; and
    - executing the deployment plan with the conditional deployment logic for the artifact based at least in part on the evaluation of the user-defined condition.

14. A system comprising:
- a storage device configured to store a deployment plan for a software application, the deployment plan specifying a plurality of artifacts for the software application and default deployment logic for the plurality of artifacts, the software application comprising a Service Oriented Architecture application, the deployment plan generated based at least in part by:
  - storing a functional representation of the Service Oriented Architecture application in a shared data store;
  - collecting metadata pertaining to software services used by the Service Oriented Architecture application; and
  - generating the deployment plan based at least in part on the functional representation and the metadata; and
- a processor configured to process the deployment plan by:
  - determining, for each artifact in the plurality of artifacts, whether the artifact is associated with a user-defined condition, the user-defined condition including variables provided by a user for modifying the deployment plan, the deployment plan modified by conditional deployment logic based at least in part on the user-defined condition; and
  - if the artifact is associated with a user-defined condition:
    - evaluating the user-defined condition; and
    - executing the deployment plan with the conditional deployment logic for the artifact based at least in part on the evaluation of the user-defined condition.

* * * * *

UNITED STATES PATENT AND TRADEMARK OFFICE
CERTIFICATE OF CORRECTION

PATENT NO. : 8,806,475 B2  
APPLICATION NO. : 12/881028  
DATED : August 12, 2014  
INVENTOR(S) : Xie Page 1 of 1

It is certified that error appears in the above-identified patent and that said Letters Patent is hereby corrected as shown below:

In the Specification

In column 3, line 27, delete "he" and insert -- the --, therefor.

Signed and Sealed this  
Tenth Day of March, 2015

Michelle K. Lee  
*Deputy Director of the United States Patent and Trademark Office*